(12) United States Patent
Sedarat et al.

(10) Patent No.: US 10,742,262 B1
(45) Date of Patent: Aug. 11, 2020

(54) METHOD AND SYSTEM FOR ETHERNET ACTIVE-PAIR DETECTION

(71) Applicant: Aquantia Corporation, San Jose, CA (US)

(72) Inventors: Hossein Sedarat, San Jose, CA (US); Dragan Labalo, San Jose, CA (US)

(73) Assignee: Marvell Asia Pte. Ltd., Singapore (SG)

( * ) Notice: Subject to any disclaimer, the term of this patent is extended or adjusted under 35 U.S.C. 154(b) by 130 days.

(21) Appl. No.: 15/620,618

(22) Filed: Jun. 12, 2017

Related U.S. Application Data

(60) Provisional application No. 62/348,629, filed on Jun. 10, 2016.

(51) Int. Cl.
*H04B 3/04* (2006.01)
*H04B 3/46* (2015.01)
*H04B 1/40* (2015.01)

(52) U.S. Cl.
CPC ............... *H04B 3/04* (2013.01); *H04B 1/40* (2013.01); *H04B 3/46* (2013.01)

(58) Field of Classification Search
CPC ............ H04B 1/40; H04B 3/04; H04B 3/46
See application file for complete search history.

(56) References Cited

U.S. PATENT DOCUMENTS

| | | | |
|---|---|---|---|
| 7,624,197 B1 * | 11/2009 | Lo ...................... | H04L 12/40136 709/233 |
| 8,588,254 B2 * | 11/2013 | Diab ................ | H04L 12/40032 370/477 |
| 2013/0301649 A1 * | 11/2013 | Vijayasankar ........ | H04L 12/413 370/445 |
| 2015/0130269 A1 * | 5/2015 | Barrass ................... | G06F 1/266 307/1 |
| 2018/0249461 A1 * | 8/2018 | Miao ..................... | H04W 48/16 |

* cited by examiner

*Primary Examiner* — David B Lugo

(57) ABSTRACT

A method of signaling between Ethernet transceiver link partners along a link is disclosed. The link includes between one to four twisted pair channels. The method includes, in an offline mode of operation, autonegotiating between the link partners during an autonegotiation sequence. A number of active pairs out of the one to four pairs of twisted pair channels is then discovered. The discovering includes transmitting a discovery signal from a transmit end of the link on the active pairs, detecting the transmitted discovery signal at a receive end of the link, and identifying the active pairs based on the detecting. The link active pairs are then trained to train transceiver operating parameters with a training sequence of symbols. In an online mode of operation, the link is operated in a data transfer mode utilizing at least one of the identified active pairs.

8 Claims, 3 Drawing Sheets

METHOD AND SYSTEM FOR ETHERNET ACTIVE-PAIR DETECTION

RELATED APPLICATION(S)

This application claims benefit of priority to Provisional U.S. Patent Application No. 62/348,629, titled "Apparatus and Method for Active Pairs Detection", filed Jun. 10, 2016, the aforementioned priority application being hereby incorporated by reference in its entirety.

TECHNICAL FIELD

The disclosure herein relates to electronic communications, and more particularly to the operation of transceivers used for transmission and reception of data in communication networks.

BACKGROUND

Ethernet is a communication standard that provides compatibility with several different data rate sub-standards that are suitable for different network bandwidths. Each generation of Ethernet typically provides a default data rate that is many orders of magnitude higher than a prior generation. The supporting communications infrastructure, such as cable and/or other media to transport signals, often lags behind the new generation, and may not be able to support the higher data rates. Reverse compatibility with older generation data rates is thus important.

While legacy compatibility for Ethernet enables new generation hardware to function with older infrastructure, the gap between the legacy data rates and new generation default data rates may be significant. For example, Ethernet transceivers that have the capability to operate at 10 Gb/s over four twisted pair channels may need to operate at one-tenth that rate, to 1 Gb/s, as the next highest supported data rate. Proposals in the art provide for sub-rates other than legacy default sub-rates.

For some Ethernet applications, operating with less than the default number of four twisted pair channels may be advantageous. A transceiver may have to be backwards compatible to existing Ethernet standards which operate on 4 pairs. Therefore, to support operation both on traditional 4-pair systems as well as reduced-pair systems, there is a need to identify whether the channel consists of 4 or fewer pairs. If this information is known in advance, it may be part of the static configuration of the system. However, if this information is not available in advance, then it will be necessary to detect the "active pairs" automatically.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Embodiments of communications systems and corresponding methods are disclosed herein. In one embodiment, a method of signaling between Ethernet transceiver link partners along a link is disclosed. The link includes between one to four twisted pair channels. The method includes, in an offline mode of operation, autonegotiating between the link partners during an autonegotiation sequence. A number of active pairs out of the one to four pairs of twisted pair channels is then discovered. The discovering includes transmitting a discovery signal from a transmit end of the link on the active pairs, detecting the transmitted discovery signal at a receive end of the link, and identifying the active pairs based on the detecting. The link active pairs are then used to train transceiver operating parameters with a training sequence of symbols. In an online mode of operation, the link is operated in a data transfer mode utilizing at least one of the identified active pairs.

In a further embodiment, a method for setting up a link between Ethernet transceiver link partners is disclosed. The link partners are interconnected via one to four twisted pair channels. The method includes advertising pairs configuration information between the transceivers during an autonegotiation sequence; training the link following the autonegotiation sequence, the training corresponding to a first pairs configuration and including detecting an inability of the link to operate in the first pairs configuration; and retraining the link, in response to detecting the inability of the link to operate in the first pairs configuration, to train the parameters for operation at a second pairs configuration, the retraining carried out without repeating the autonegotiation sequence.

Figure 1:
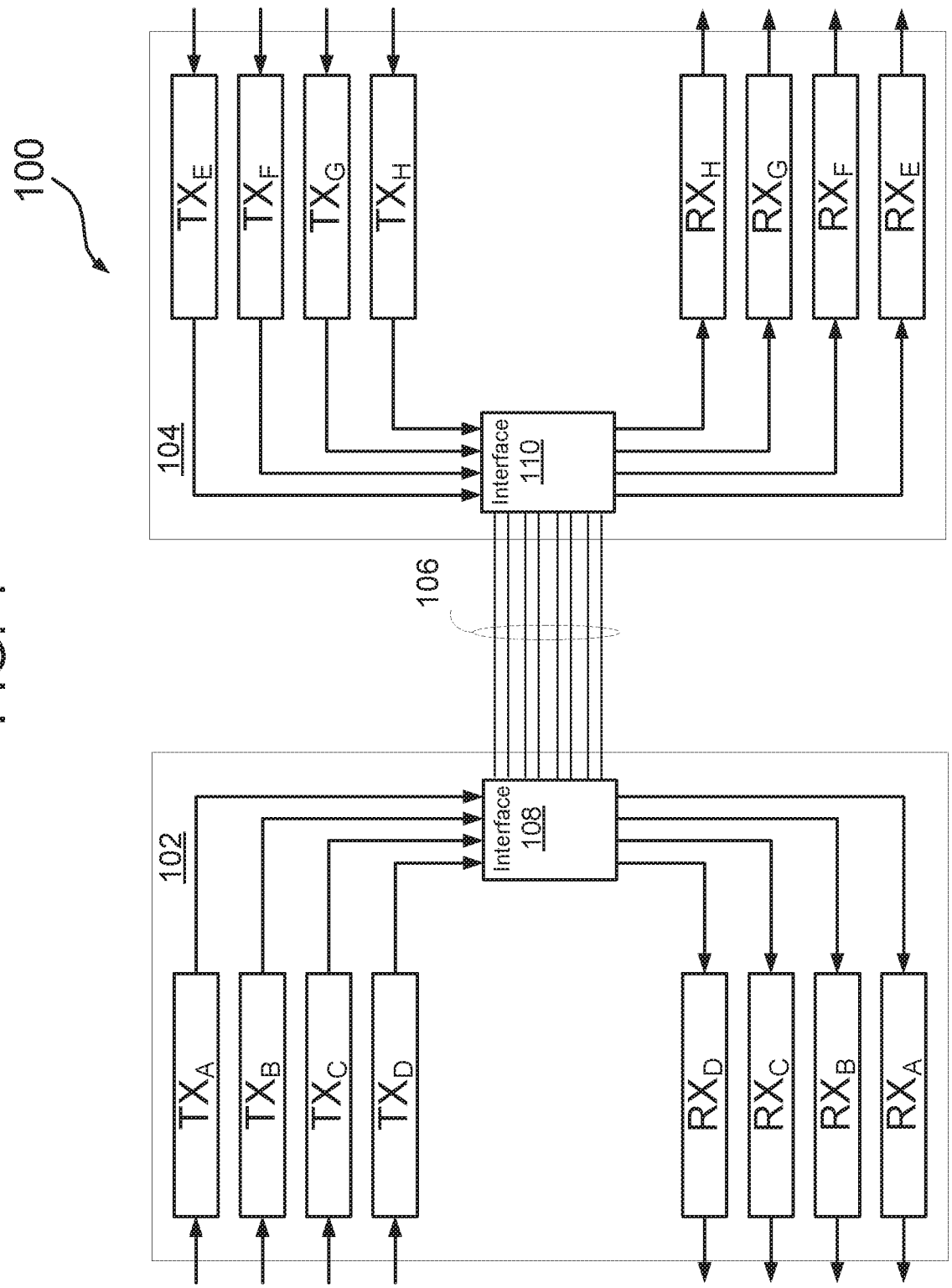
FIG. 1 illustrates one embodiment of a communication system in the form of an Ethernet link.

FIG. 1 is a block diagram illustrating one embodiment of a communication system 100. The system includes a first transceiver 102 and a second transceiver 104 that can communicate with each other. The first transceiver 102 includes "transceiver components" including one or more transmitters TXA-TXD and one or more receivers RXA-RXD. Similarly, the second transceiver 104 includes various transceiver components including one or more transmitters TXE-TXH and one or more receivers RXE-RXH. The transmitters TXA-TXH shown in FIG. 1 can be considered individual "transmitters," as typically referenced herein, or can be considered individual transmitter channels which a transmitter block within the transceiver can independently transmit signals on. Similarly, receivers RXA-RXH can be considered individual "receivers," as typically referenced herein, or can alternately be considered individual receiver channels which a receiver block within the transceiver can independently receive signals on. The transmitters and receivers are connected to one or more components (not shown) of a computer system, device, processor, or other "controller" associated with each respective transceiver that want to communicate data over the communication network. For example, the transmitters receive data and control signals from the controller connected to the first transceiver 102 in order to send the data over the network to other transceivers and controllers, while the receivers receive data from other transceivers and controllers via the network in order to provide the data to the controller connected to the first transceiver 102.

The first transceiver 102 can communicate with the second transceiver 104 over one or more communication channels of a communication link 106. In one embodiment, such as that corresponding to the 10GBASE-T Ethernet standard, four communication channels are provided on the communication link 106, each channel including a twisted pair cable. Thus, in that standard, there are four transmitters TX and four corresponding receivers RX provided in each of the transceivers 102 and 104, each transmitter associated with one of the local near-end receivers in the same transceiver, and each such transmitter/receiver pair dedicated to one channel used for duplex communication. A transmitter/receiver pair in the first transceiver 102 communicates across a channel of the link 106 to a far-end transmitter/receiver pair in the second transceiver 104. A transmitter TX and a receiver RX that are connected to the same channel/link, or two transceivers connected by the communication link 106, are considered "link partners." For some embodiments, a given signaling cable may provide for four channels over the link, but less than all of the four channels, or "pairs", may be actively connected for data transfers along the link.

An interface 108 can be provided in the first transceiver 102 and an interface 110 can be provided in the second transceiver 104 to allow data transmissions between the transceivers to be routed to the appropriate transceiver blocks. For example, the interfaces 108 and 110 can include transformers, and circuitry used for directing signals or data (alternatively, some or all circuitry can be included in other components, such as transmitters TX and receivers RX).

The communication link 106 may take the form of various cable media such as unshielded twisted pair cable meeting various standards, such as CAT-5e, CAT-6, CAT-6a, CAT-7 and so forth. Moreover, as noted above, the network devices that employ the link may utilize less than all of the pairs provided in a given cable. The communication system 100 of FIG. 1 accounts for the type of cable used and the number of active pairs, among other things, by carrying out a unique autonegotiation, discovery and training procedure, as more fully described below.

Figure 2:
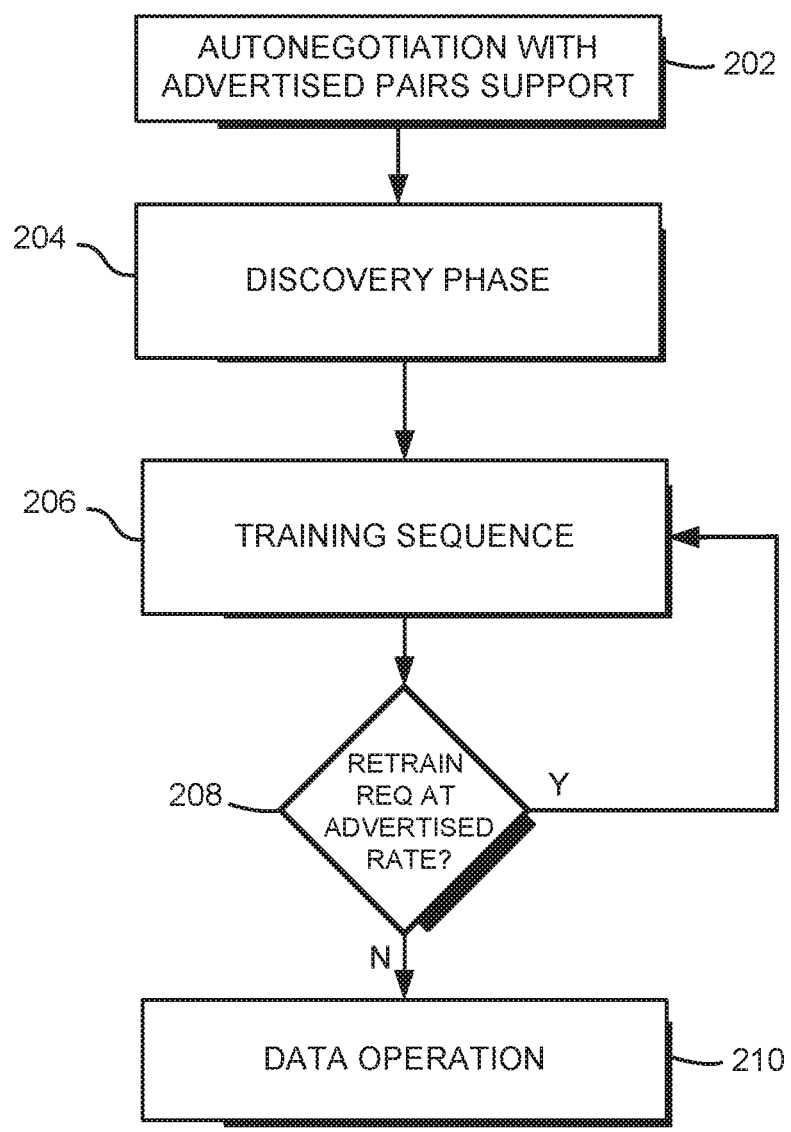
FIG. 2 illustrates one embodiment of a method of establishing communication between the Ethernet transceivers of FIG. 1.

FIG. 2 illustrates a flowchart of high-level steps employed by one embodiment of a method that may be carried out to set up the communications system 100 for operation. For one specific embodiment, the communications system employs transceivers that are capable of transmitting and receiving data at 10 Gbps, and compatible with high-speed Ethernet standards such as the 10GBASE-T and/or NBASE-T Standards. To maintain backward interoperability, the capability to support fewer pairs is advertised during an autonegotiation phase of the link, at 202. During this phase the basic capabilities, such as supported data-rates, are advertised and settled on. Once it is determined that both link-partners are capable of supporting fewer number of pairs, then the transceivers may identify which of the pairs are available for establishing a link at the negotiated data-rate. The autonegotiation process allows the transceivers at each end of the link to advertise their capabilities, such as speed, transceiver type, half or full duplex, etc. Further, the autonegotiation process may automatically select the operating mode for communication on the link.

As noted above, for one specific embodiment, the autonegotiation advertising identifies support for operating modes that utilize less than a default of four "pairs", or channels. For some embodiments, reduced-pair data rate capabilities, or "sub-rate" modes may also be advertised, such as a 5 Gbps mode, a 2.5 Gbps mode, a 1 Gbps mode, or less. The sub-rate and/or active pair support modes may be advertised, for example, in ways more fully described in copending U.S. patent application Ser. No. 14/459,260, titled: "Method and System for Ethernet Transceiver Rate Control", filed Aug. 13, 2014, assigned to the Assignee of the instant application, and incorporated by reference in its entirety.

In addition to advertising whether or not reduced-pair modes are supported (with respect to a default 4-pair mode), the autonegotiation method provides a way to synchronize the link partners so that subsequent discovery and training phases are carried out by each link partner at substantially the same time. Synchronization may involve having both link immediately enter the discovery phase immediately following completion of the autonegotiation method, and remaining in the discovery phase for a known duration.

Following autonegotiation, the link may immediately undergo the discovery phase of operation, at 204. During discovery, each transceiver transmits a signal on all four pairs, while respective link partners monitor the pairs to identify which pairs are associated with the discovery signal. The discovery process occurs at each end of the link, such that the discovery signal is transmitted in both directions along the link.

For one embodiment, the discovery signal involves a known pattern of symbols that are transmitted along the active link pairs by respective link partner transmitters. Corresponding link partner receivers for each pair are enabled for a predetermined duration to adequately detect the pattern, if transmitted. The duration should be long enough and known to both link partners to maximize the robustness of the detection process. The detected pattern may then be compared to a known sequence to verify the pattern, thus identifying the pair as an "active pair." The discovery signal may be a periodic pattern, a pseudo random signal, or a special burst sequence, such as the "Alert" signal sequence used in 10G Energy Efficient Ethernet. An "Alert" type of signal generally involves a pseudorandom sequence of symbols that may be easily detected by a simple receiver in the presence of background noise. For one embodiment, the "Alert" signal may carry 1-bit of information by transmitting several bits, or symbols, to carry the single bit of information. The pattern is generally known by the receiver, which continually correlates when receiving the sequence. Once sensed, the cross-correlation is very strong.

For some embodiments, during discovery, a "master" end of the link may generate a "master alert" signal, while the "slave" end of the link generates a "slave alert" signal. These respective alert signals are sent at the same time in a bidirectional manner along the link. The master alert signal and the slave alert signal are orthogonal, and therefore any reflections on the link have little to no impact on alert signal sensing.

While cross-correlating the detected signal to an expected signal is one way of verifying the discovery signal, for some embodiments, other methods such as narrowband or wideband power detection may be employed. While detection of some of these discovery signal types, such as the Alert signal, may be very resilient to noise and disturbance, in some situations, and depending on the discovery signal employed, echo and/or crosstalk cancellation may be utilized to resolve the signal. The role of Master and Slave, which is negotiated during the autonegotiation phase, can be used to configure the discovery signal for link-partners, such that they are not correlated; hence do not detrimentally affect the detection on the other side. For a given default of four pairs, if the discovery signal is detected on a given pair, then that pair is identified as "active."

In some embodiments, the discovery phase may involve not only actively detecting which pairs are associated with an indicator of "active pair" significance, but also may involve excluding a given pair as an "active pair" due to, for example, a lack of signal detection, or any other form of training failure. Further, as explained in detail below, even if a given pair is identified as an "active pair", signaling impairments in the pair may justify the pair being excluded from normal operation, resulting in a different pairs configuration than originally set.

For one embodiment, once the discovery phase is complete, the link undergoes a training sequence of steps, at 206, for the "active pairs" identified during the discovery phase. In general, the training involves transmitting and receiving sequences of symbols to verify certain operating parameters for the active pairs. For example, the training procedure may include setting transmit power levels, adjusting echo and near-end crosstalk filters, adjusting equalizers, selecting precoder coefficients, and so forth. During the training sequence, an indication of a link failure may arise from running any of the training sub-routines. Once the training is complete, a determination may be made, at 208, as to whether a retrain is required at the advertised rate. If so, a link retrain may be carried out, at 206. If not, then the link may be operated in a data mode of operation, at 210.

In some embodiments, it may be desirable to use the maximum number of available pairs for data transmission, as this may improve the link performance margin. In such circumstances, the discovery phase may be implemented into the training phase of operation through use of either the power detection capability often employed during training, or use of SNR information that are obtained during training, or other means.

Figure 3:
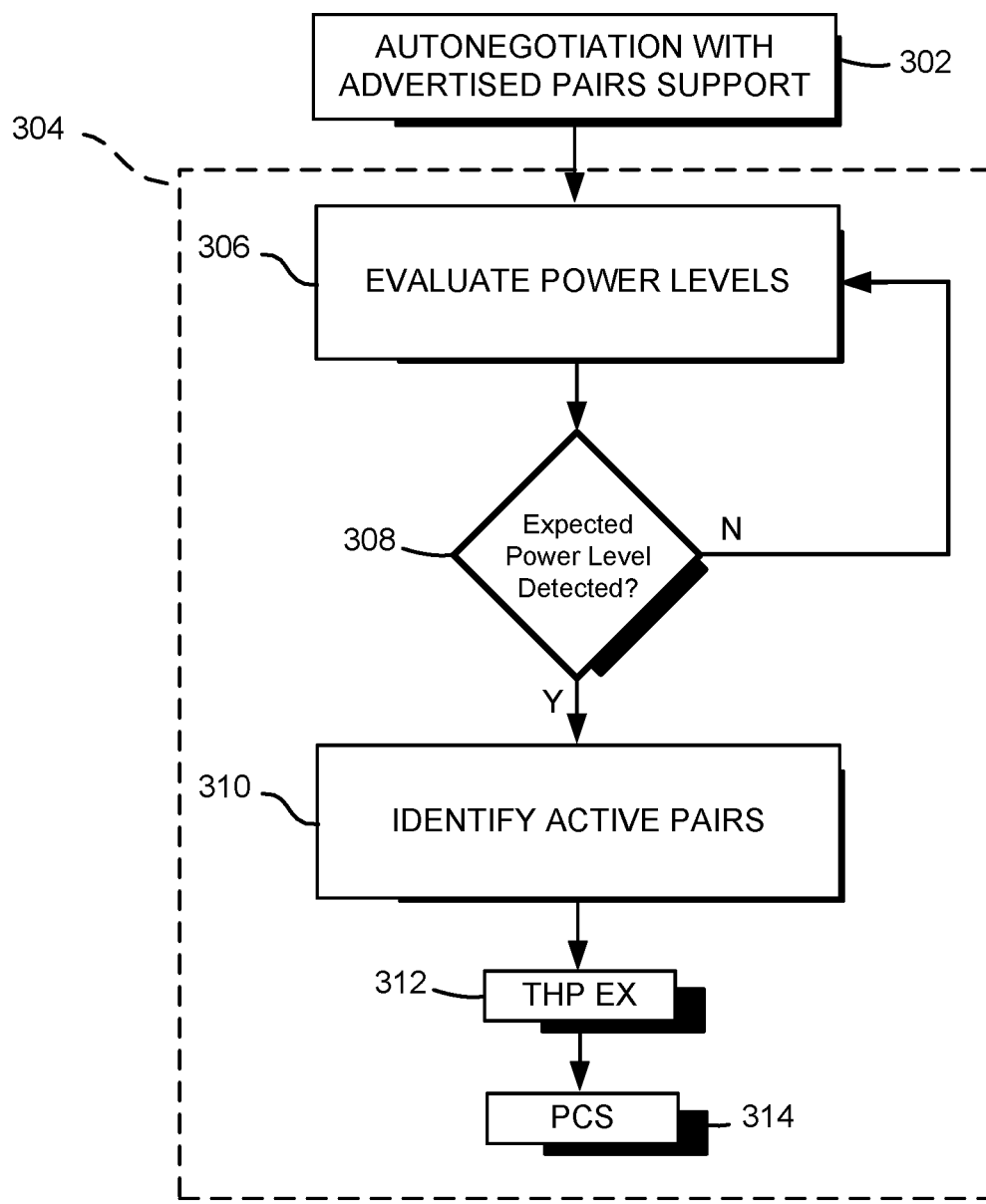
FIG. 3 illustrates a further embodiment of a method of establishing communication between the Ethernet transceivers of FIG. 1.

FIG. 3 illustrates a flowchart of steps similar to those of FIG. 2, but incorporating the discovery phase into the training sequence of steps. As explained above, the training process starts after autonegotiation, where a first training sequence of symbols is initiated for all active pairs, at 302. The training steps then begin, at 304 (in phantom). At the receive side of the link, the signal power levels are evaluated for each pair, at 306, in a manner where a detected power signature corresponds to an expected four active pairs or not. If the expected signal power is not detected, at 308, and if both link partners are capable of supporting fewer than four pairs, then training begins again with two pairs. The active pairs are the identified as the ones that show detected power. Alternatively, the training may continue on all 4 pairs and the active pairs may be identified by channels with reasonable received power and/or good SNR and/or locked training signal, etc. Once the active pairs are identified, the training may be continued with the additional information about active pairs, or a new training sequence may be restarted to match the proper sequence associated with the active pairs. If there is a need to restart training, the new training may start immediately without going through a new phase of autonegotiation. Using a consistent discovery interval for each training transition provides for synchronization between link partners. Similarly, if the second training attempt fails due to failure to detect adequate signal power, then the link partners carry out a third training attempt over a single pair.

Further referring to FIG. 3, once the active pairs are identified, at 310, training sequence continues or restarts with the additional information on active pairs. For instance, for a training sequence that is based on 10GBASE-T, a Tomlinson-Harashima precoder (THP) exchange may take place, at 312. The THP coefficients provide pre-emphasis tap filter values for the transmit precoder portions of each transceiver. The training sequence may then go into a PCS test state, at 314. In the PCS test state, the link partners send PCS frames along the active pairs using the final coding and modulation for sending scrambled test data at the requested data rate.

During the training steps described above, should indications of a link failure arise during any of the training sub-routines, a link retrain may be carried out consistent with the various retrain embodiments described in U.S. Ser. No. 14/459,260. Further, as noted above, link training failures on any pair may be indicative of a given pair not being an "active pair."

For some embodiments, even though a given pair may be discovered as "active", crosstalk and/or other channel attenuation may affect the pair in a manner such that link performance may be enhanced without using the pair. For example, autonegotiation may reveal a link data rate of 1 Gbps over four or two pairs is supported. Further, all four pairs may be identified as "active pairs." However, should one or more of the pairs exhibit high crosstalk, low SNR, or other form of signal attenuation, instead of four pairs being used, the system may reconfigure to a two-pair configuration for transferring at 1 Gbps.

In the event of a reconfiguration, as noted above, certain configurations may be achieved more readily than others. For example, configurations that are derived from default 10GBASE-T configurations (such as 4-pair configurations running at 5 Gbps and 2.5 Gbps) may be readily reconfigured and may be able to "continue" training, as opposed to retraining due to reconfiguring to a 2-pair or single-pair configuration.

Those skilled in the art will appreciate that the process described above provides a unique way to identify and train Ethernet "active pairs" in an efficient manner without having to repeat multiple autonegotiation sequences. This minimizes link downtime, and improves the reliability and data transfer efficiency of the link. Further, the process described above enables for a maximum allowable number of active pairs that may optimize the actual capabilities of the link, rather than settling for a potentially lower number of pairs that may be less than optimal for link operation.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments.

Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A method of signaling between Ethernet transceiver link partners along a link, the link including between one to four twisted pair channels, the method comprising:

in an offline mode of operation,
autonegotiating between the link partners during an autonegotiation sequence;
discovering a number of active pairs out of the one to four pairs of twisted pair channels, the discovering including
transmitting a discovery signal from a transmit end of the link on the active pairs,
detecting the transmitted discovery signal at a receive end of the link, the detecting including measuring a power parameter associated with the discovery signal and comparing the measured power parameter to an expected power parameter, the number of active pairs based on a result of the comparing, and
identifying the active pairs based on the detecting;
training the link active pairs to train transceiver operating parameters with a training sequence of symbols; and
in an online mode of operation,
operating the link in a data transfer mode utilizing at least one of the identified active pairs.

2. The method according to claim 1, wherein the autonegotiating comprises:
advertising support for less than a default configuration of four twisted pair channels.

3. The method according to claim 1, wherein the autonegotiating comprises:
synchronizing the link partners to carry out the discovering within a same time interval.

4. The method according to claim 1, wherein utilizing at least one of the identified active pairs comprises:
utilizing a maximum number of the identified active pairs.

5. A system for establishing a link between Ethernet transceiver link partners, the link partners interconnected via one to four twisted pair channels, the system comprising:
one or more circuits of a transceiver operable to autonegotiate between the link partners during an autonegotiation sequence;
one or more circuits of the transceiver operable to discover a number of active pairs out of the one to four twisted pair channels, the one or more circuits operable to discover including
transmit circuitry to transmit a discovery signal from a transmit end of the link on the active pairs,
power measurement circuitry to detect the transmitted discovery signal at a receive end of the link by measuring a power parameter associated with the discovery signal and comparing the measured power parameter to an expected power parameter, the number of active pairs based on a result of the comparing, and
circuitry to identify the active pairs based on the detecting; and
one or more circuits of the transceiver operable to train transceiver operating parameters with a training sequence of symbols.

6. The system according to claim 5, wherein the one or more circuits of a transceiver operable to autonegotiate between the link partners during an autonegotiation sequence are operable to advertise support for less than a default configuration of four twisted pair channels.

7. The system according to claim 5, wherein the one or more circuits of a transceiver operable to autonegotiate between the link partners during an autonegotiation sequence are operable to synchronize the link partners to carry out the discovering within a same time interval.

8. The system according to claim 5, further comprising:
one or more circuits of a transceiver operable to, in an online mode of operation, utilize a maximum number of the identified active pairs during data transfer operations.

* * * * *